(12) United States Patent  (10) Patent No.: US 11,093,414 B2
Jin et al.  (45) Date of Patent: Aug. 17, 2021

(54) MEASURING PER-NODE BANDWIDTH WITHIN NON-UNIFORM MEMORY ACCESS (NUMA) SYSTEMS

(71) Applicant: INTEL CORPORATION, Santa Clara, CA (US)

(72) Inventors: Yao Jin, Shanghai (CN); Ashok Raj, Portland, OR (US); Anthony E. G. Luck, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 16/326,116

(22) PCT Filed: Sep. 28, 2016

(86) PCT No.: PCT/CN2016/100545
§ 371 (c)(1),
(2) Date: Feb. 15, 2019

(87) PCT Pub. No.: WO2018/058363
PCT Pub. Date: Apr. 5, 2018

(65) Prior Publication Data
US 2019/0205058 A1 Jul. 4, 2019

(51) Int. Cl.
*G06F 13/16* (2006.01)
*G06F 12/08* (2016.01)
(Continued)

(52) U.S. Cl.
CPC ........ *G06F 13/1652* (2013.01); *G06F 3/0604* (2013.01); *G06F 3/067* (2013.01);
(Continued)

(58) Field of Classification Search
CPC ............. G06F 12/0811; G06F 12/0868; G06F 12/0806; G06F 12/0815; G06F 12/0828;
(Continued)

(56) References Cited

U.S. PATENT DOCUMENTS

| 6,347,362 B1 * | 2/2002 | Schoinas ............. G06F 11/3006 |
| | | 711/147 |
| 2013/0138885 A1 | 5/2013 | Kurtz et al. |
| 2014/0173248 A1 * | 6/2014 | Varma ................... G06F 9/3885 |
| | | 712/30 |

FOREIGN PATENT DOCUMENTS

| CN | 102541460 A | 7/2012 |
| CN | 104050043 A | 9/2014 |

(Continued)

OTHER PUBLICATIONS

International Preliminary Report on Patentability, PCT App. No. PCT/CN2016/100545, dated Apr. 11, 2019, 6 pages.

(Continued)

*Primary Examiner* — Reginald G Bragdon
*Assistant Examiner* — Thanh D Vo
(74) *Attorney, Agent, or Firm* — Nicholson De Vos Webster & Elliott LLP

(57) ABSTRACT

A computing system includes a plurality of nodes including a first node, the first node including at least one core, a memory controller, a node-track register (MSR), and a monitoring counter array including a plurality of counters. The memory controller is to access a plurality of bits of the node-track MSR to determine a subset of nodes to be tracked, wherein the subset of nodes includes the first node and a second node. The memory controller is further to allocate a first counter of the plurality of counters to track memory requests sent to a local system memory by the first node; and allocate a second counter of the plurality of counters to track a memory response associated with a memory request sent by the first node to the second node.

15 Claims, 12 Drawing Sheets

(51) Int. Cl.
  *G06F 12/0811* (2016.01)
  *G06F 11/30* (2006.01)
  *G06F 11/34* (2006.01)
  *G06F 13/14* (2006.01)
  *G06F 12/0806* (2016.01)
  *G06F 12/0842* (2016.01)
  *G06F 3/06* (2006.01)
  *G06F 13/40* (2006.01)

(52) U.S. Cl.
  CPC .......... *G06F 3/0611* (2013.01); *G06F 3/0631* (2013.01); *G06F 3/0653* (2013.01); *G06F 11/3037* (2013.01); *G06F 11/3419* (2013.01); *G06F 12/08* (2013.01); *G06F 12/0806* (2013.01); *G06F 12/0811* (2013.01); *G06F 12/0842* (2013.01); *G06F 13/14* (2013.01); *G06F 13/1657* (2013.01); *G06F 13/1668* (2013.01); *G06F 13/4027* (2013.01); *G06F 2201/81* (2013.01); *G06F 2201/88* (2013.01); *G06F 2201/885* (2013.01); *G06F 2212/62* (2013.01)

(58) Field of Classification Search
  CPC .. G06F 12/0842; G06F 13/14; G06F 13/1652; G06F 13/1657; G06F 13/1668; G06F 2212/2542
  See application file for complete search history.

(56) References Cited

FOREIGN PATENT DOCUMENTS

EP 0848330 A2 6/1998
WO 9635169 A1 11/1996

OTHER PUBLICATIONS

International Search Report and Written Opinion for Application No. PCT/CN2016/100545, 11 pages, dated Jun. 29, 2017.

* cited by examiner

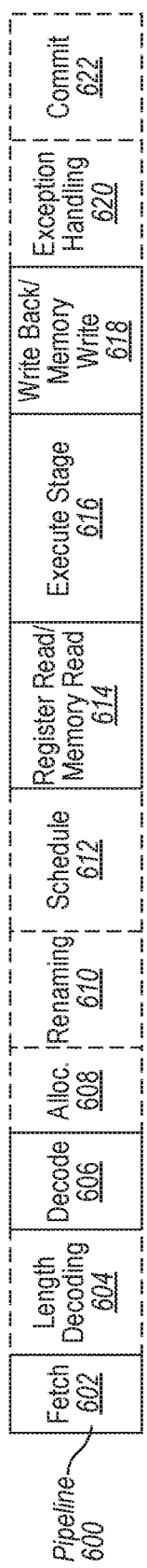
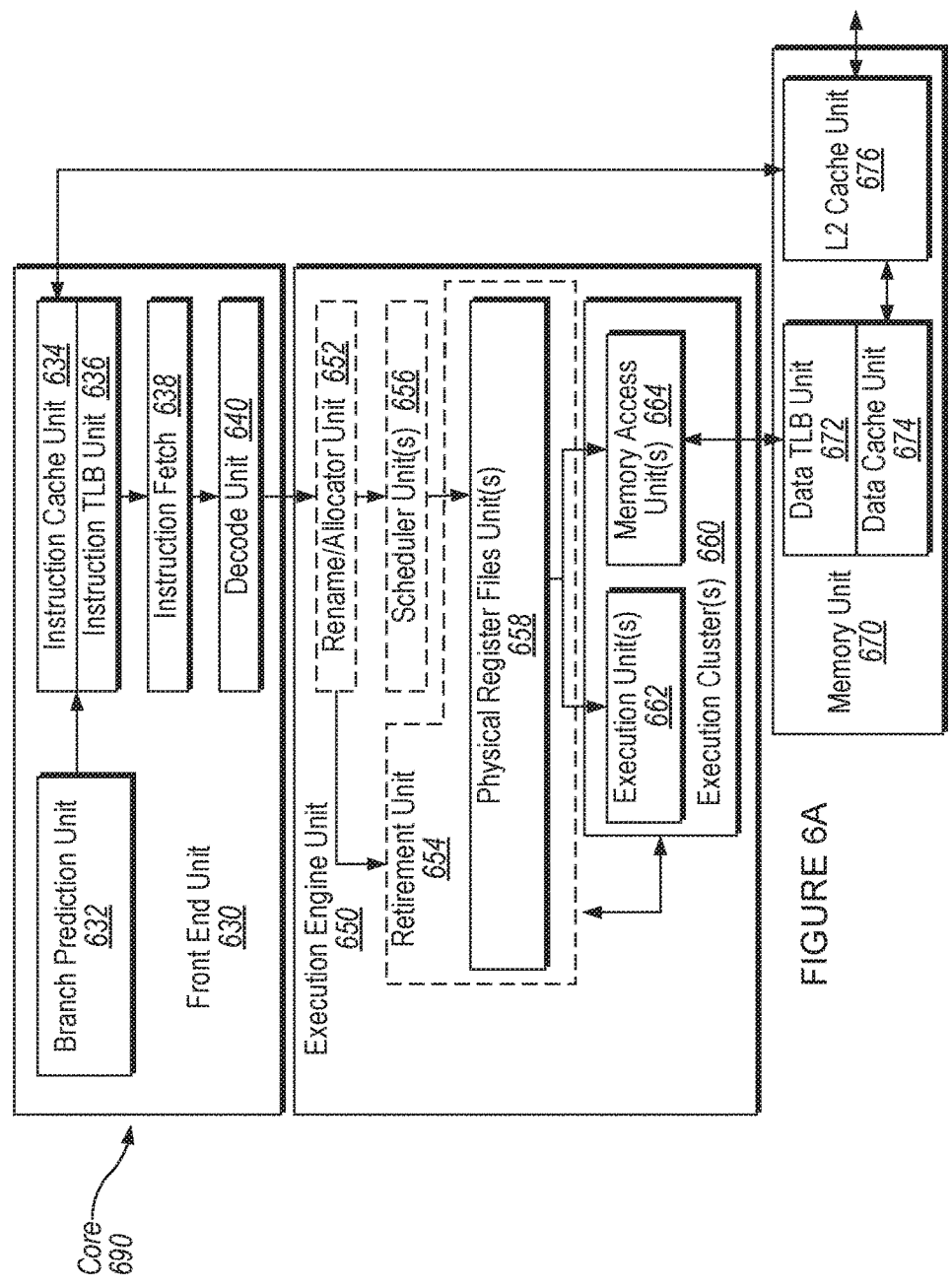
FIGURE 6B
FIGURE 6A

MEASURING PER-NODE BANDWIDTH WITHIN NON-UNIFORM MEMORY ACCESS (NUMA) SYSTEMS

The present disclosure relates to the field of memory management and, in particular, to the measurement of a per-node bandwidth within a NUMA system.

BACKGROUND

Computing systems such as servers are increasingly NUMA-based, which means processing nodes may allocate to memory in a non-uniform manner across a plurality of nodes, where each node includes processing core(s), a cache subsystem, and memory.

BRIEF DESCRIPTION OF THE DRAWINGS

FIG. 6A is a block diagram illustrating an in-order pipeline and a register renaming stage, out-of-order issue/execution pipeline according to one embodiment.

FIG. 6B is a block diagram illustrating a micro-architecture for a processor that provides measurement capability of memory bandwidth on a per-node basis.

DESCRIPTION OF EMBODIMENTS

Figure 1A:
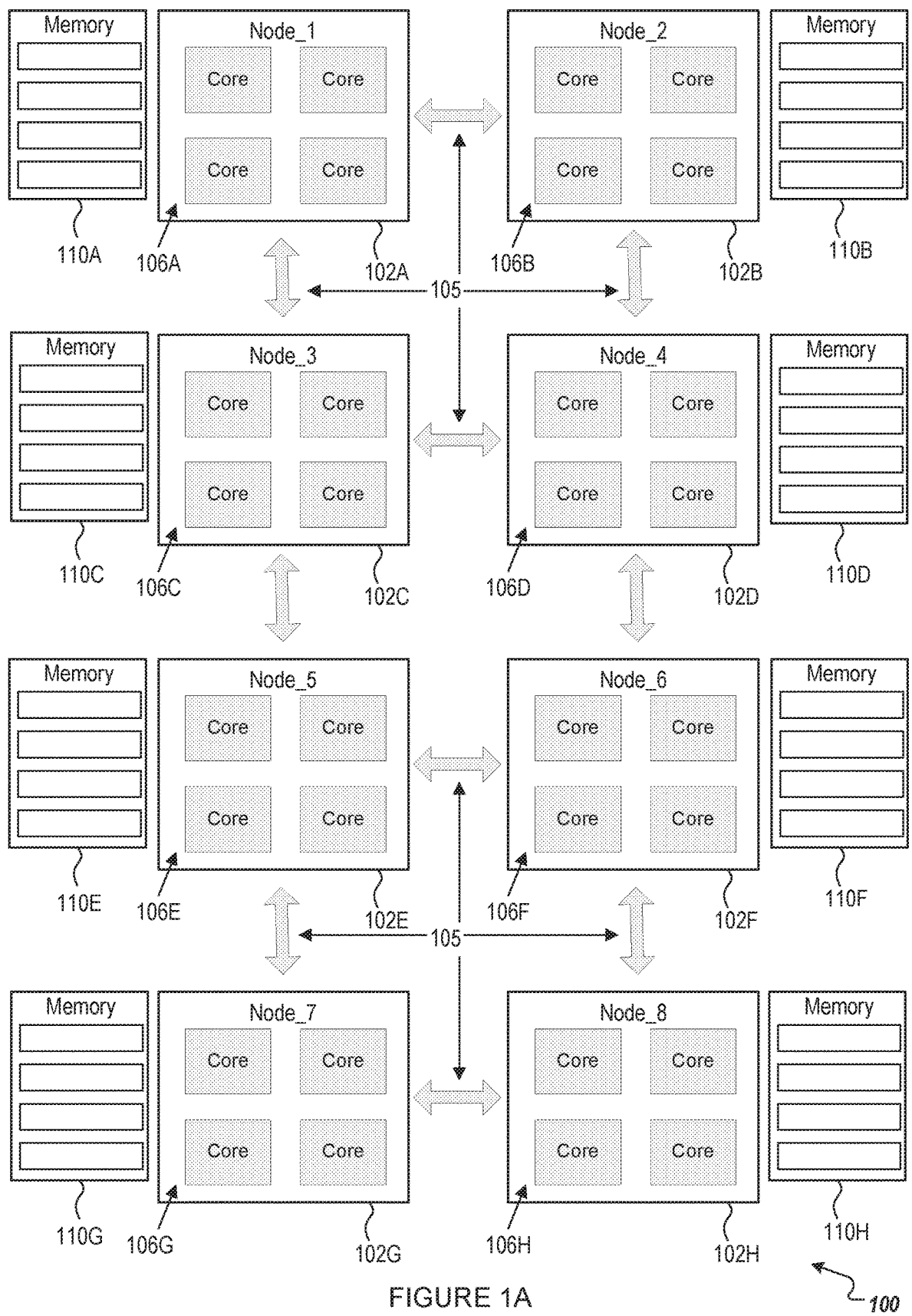
FIG. 1A is a block diagram of a non-uniform memory access (NUMA) system, according to an embodiment of the present disclosure.

Non-uniform memory access (NUMA) is a computer memory design used in multiprocessing, where the memory access time depends on the memory location relative to the processor, which is referred to herein as a node. Under NUMA, a node may access its own local memory faster than non-local memory (memory local to another node or memory shared between nodes). The benefits of NUMA may be associated with particular workloads, e.g., workloads on servers (that employ NUMA) where the data are often associated strongly with certain tasks or users. In this case, a thread may be executed on one or more nodes and share memory (located local to each node) to speed up execution.

Accordingly, as part of NUMA-based memory allocation, a node may at some point start to allocate more to remote memory than to local memory, leading to poor data locality. To allocate to memory is to decide where to store (or cache) the data. "Data locality" herein refers to spatial locality, e.g., how close to a node is the memory located to which the node is allocating data. Because latency for a node to access remote memory (e.g., memory of another node) is three to six times the latency to access local memory (e.g., memory of the node), poor data locality may significantly impact computing system performance.

In one embodiment, system software running on top of a NUMA-based system may obtain a number of Remote Memory Accesses (RMA) and a number of Local Memory Accesses (LMA) for a node. The number of RMA corresponds to memory accesses to remote nodes (e.g., total memory accesses minus LMA). Getting total memory accesses is described below in detail. The number for LMA is the number of memory accesses to local memory of a node. A high ratio of the RMA to the LMA may indicate that a thread has worse data locality than when the ratio of RMA to LMA is a comparatively lower ratio. Without knowledge of the per-node RMA, however, the system software does not know at which node is better to execute the thread to improve data locality of that thread.

Besides this ratio of the RMA to the LMA, memory bandwidth is another metric that may be used to measure data locality. Memory bandwidth is a measure of cache utilization, such as a measure of cache misses as a result of memory accesses between two hierarchical levels of memory for a thread, e.g., between last level cache (LLC) and system memory. For example, a node may track cache misses at the LLC as a measure of how much data is read into the LLC from system memory due to the cache misses. In one embodiment, the node may correlate these cache misses to specific nodes to determine a per-node memory bandwidth.

According to one embodiment of the present disclosure, the disclosed NUMA-based system may facilitate system software in obtaining per-node memory bandwidth. Using the per-node memory bandwidth, the system software may choose to shift a thread executing on one node to another node with a better data locality.

More specifically, in one embodiment, a NUMA-based system may include multiple nodes. One of these nodes may include an LLC coupled to at least one processing core, a memory controller, a node-track model-specific register (MSR), and a monitoring counter array including a plurality of counters. The node, executing system software (such as an operating system), may set a plurality of bits within the node-track MSR, the plurality of bits indicating a subset of nodes of the plurality of nodes to be tracked for memory bandwidth. The subset of nodes may include the node. The memory controller may then access the plurality of bits of the node-track MSR and assign, to the plurality of counters based on the plurality of bits, tracking of memory responses associated with memory requests of respective nodes of the subset of nodes. Tracking of memory responses may, for example, track cache misses at the LLC, on a per-node basis, as a result of memory requests targeted towards the subset of nodes. In an alternative embodiment, the memory controller may track hardware events at the memory controller indicative of cache utilization.

In one embodiment, the memory controller of the node may also tag memory requests with a resource monitoring identifier (RMID). Each core is assigned an RMID associated with a thread the core is executing, and a single RMID is active at any given time. The memory controller also already knows the node ID of a memory response because it is static information of the processing core. In this way, when a memory request misses the LLC at the node, the memory controller of the node may determine the RMID and node ID associated with the cache miss, and update a counter within the plurality of counters that corresponds to the RMID and the node ID of the cache miss. The RMID and the node ID correspond to a node to which the memory request was sent. Over time, each counter assigned to a specific node of the subset nodes tracks a per-node count of cache misses associated with the RMID. The counter values for each node may be multiplied by a pre-determined scale factor to determine the per-node memory bandwidth. If the memory bandwidth of a second node of the subset of nodes is a threshold amount higher than the memory bandwidth of the node, the system software may migrate execution of the thread to the second node from the node. The threshold amount higher may, for example, be two or three times the memory bandwidth of the node or some other predetermined ratio.

In one embodiment, to facilitate retrieving counter values, system software may set a number of bits within an event selection MSR of the node. For example, system software may set bits of an event identifier portion to specify node bandwidth as the event ID, bits of a node identifier portion to specify the node ID, and bits of an RMID portion to specify the RMID. The memory controller may access the event selection MSR to identify the RMID and the node ID for a desired counter, and store in a counter MSR of the first node, a counter value from the monitoring counter array corresponding to the node ID and the RMID. The counter MSR is accessible to the system software, which may retrieve the counter value. The setting the bits of the event selection MSR and the retrieving the corresponding counter value may be performed serially and iteratively for each node until the counter values for the subset of nodes are retrieved. The counter values may then be used to determine a per-node memory bandwidth for determining which node is best to execute the thread in terms of data locality.

FIG. 1A is a block diagram of a non-uniform memory access (NUMA) system 100, according to an embodiment of the present disclosure. The system 100 may include a plurality of nodes 102A . . . 102H. Although eight nodes are shown, the system 100 may include fewer or more nodes than eight. Each node may also include one or more processing cores and a local memory. Accordingly, a first node 102A may include core(s) 106A and local system memory 110A, a second node 102B may include core(s) 106B and local system memory 110B, a third node 102C may include core(s) 106C and local system memory 110C, a fourth node 102D may include core(s) 106D and local system memory 110D, a fifth node 102E may include core(s) 106E and local system memory 110E, a sixth node 102F may include core(s) 106F and local system memory 110F, a seventh node 102G may include core(s) 106G and local system memory 110G, and an eighth node 102H may include core(s) 106H and local system memory 110H. The plurality of nodes may be interconnected with interconnects such as with a point-to-point processor interconnect 105, e.g., a QuickPath Interconnect (QPI™) or UltraPath Interconnect (UPI™) or the like.

Figure 1B:
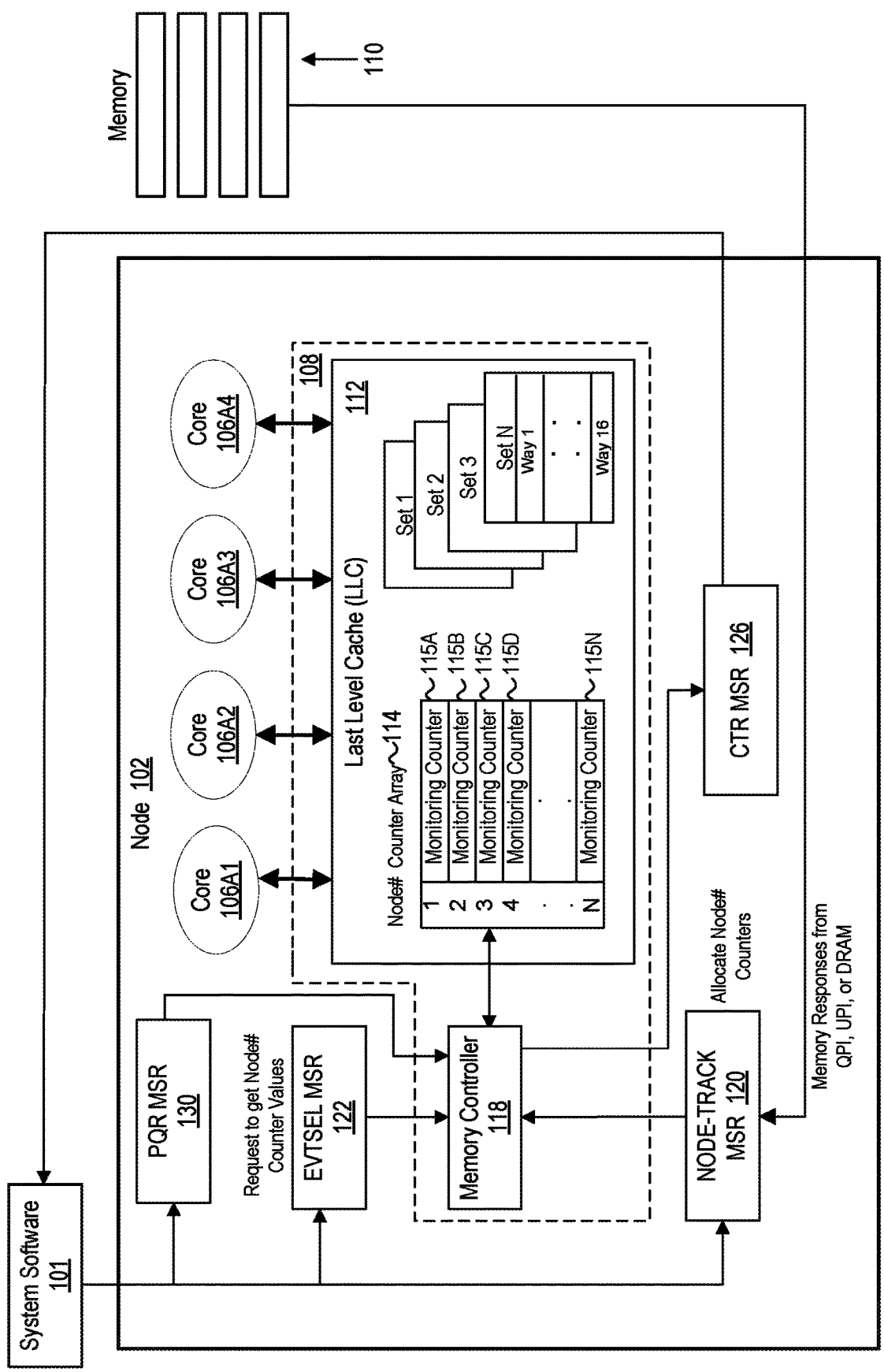
FIG. 1B is a block diagram of a node of the plurality of nodes in the NUMA system of FIG. 1A, according to an embodiment of the present disclosure.

FIG. 1B is a block diagram of a node 102 of the plurality of nodes in the NUMA system of FIG. 1A, according to an embodiment of the present disclosure. In one example, one or more of the nodes 102A . . . 102H, any one of which may be the node 102 of FIG. 1B, may execute software 101 such as an operating system, a virtual machine monitor (VMM) for controlling one or more virtual machines, or other software. The node 102 may include one or more cores 106A1, 106A2, 106A3, and 106A4, for example, and a cache subsystem 108 that includes at least a last level cache (LLC) 112 and a memory controller 118. The LLC 112 may be a last level of cache within a hierarchical set of caches that also includes a level one cache, level two cache, and so forth.

The LLC 112 may cache entries of memory responses received from the local system memory 110 or through the point-to-point processor interconnect 105 received from other nodes. The LLC 112 may include, in addition to cache lines organized into sets of ways, a monitoring counter array 114 including a plurality of monitoring counters 115A, 115B, 115C, 115D, . . . 115N (hereinafter referred to as "counters"). In an alternative embodiment, the monitoring counter array 114 is stored as part of the cache subsystem 108 but outside the LLC (not shown). Table 1 illustrates an example of the monitoring counter array 114, in which memory bandwidth is tracked per RMID (first column) and the remainder of the columns represent, per the RMID, counters for local memory bandwidth (LOCAL_BW), total memory bandwidth (TOTAL_BW), and memory bandwidth for any four nodes (Node #). (Note that, for simplicity, the monitoring counter array 114 illustrated in FIG. 1B reflects a single group of counters for one RMID, although additional groups of counters for additional RMIDs may also be included.) In one embodiment, in addition to counters tracking the local bandwidth (for the node 102) and total bandwidth (for nodes 102A . . . 102H), the monitoring counter array 114 includes counters for a certain number of specific nodes. For simplicity, illustrated in Table 1 are four counters that may be allocated to tracking memory responses to memory requests sent to four specific nodes, but fewer or more nodes may be tracked depending on allocation of counters that are available within the monitoring counter array 114.

TABLE 1

| RMID | LOCAL_BW | TOTAL_BW | Node# | Node# | Node# | Node# |
|---|---|---|---|---|---|---|
| 0 | . . . | . . . | . . . | . . . | . . . | . . . |
| 1 | . . . | . . . | . . . | . . . | . . . | . . . |
| . . . | . . . | . . . | . . . | . . . | . . . | . . . |
| MAXRMID | . . . | . . . | . . . | . . . | . . . | . . . |

The node 102 may further include a number of model-specific registers (MSRs) for performing the allocation of the counters, tagging memory requests, tracking memory responses to those requests, and acquiring counter values to be used in determining memory bandwidth. For example, the node 102 may include a node-track MSR 120, an event selection MSR 122, a counter MSR 126, and a per-logical-processor (PQR) MSR 130.

Figure 2:
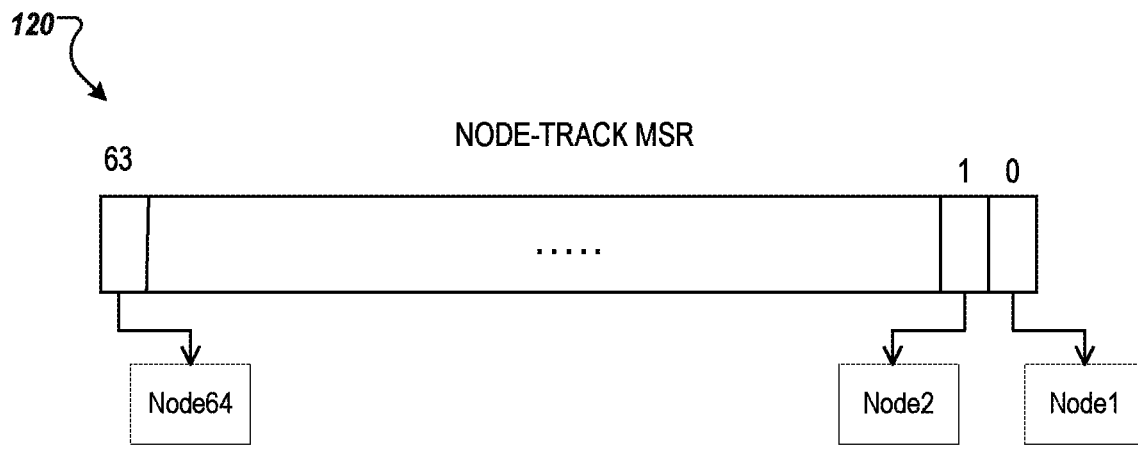
FIG. 2 is a block diagram representation of a node-track model-specific register (MSR), according to an embodiment of the present disclosure.

More specifically, in one embodiment, the node-track MSR 120 may include a plurality of bits that correspond to the maximum number of nodes within the system 100. Although the system may not include 64 nodes, FIG. 2 illustrates an embodiment of the node-track MSR 120 in which there are 64 bits. Each bit of the node-track MSR may reference a specific node. In some embodiments, the counters in the monitoring counter array 114 do not cover all the nodes. For example, given the NUMA system 100 of FIG. 1 that includes eight nodes, there may only be four counters (as shown in Table 1) with which the node 102 may track memory responses. Accordingly, the system software 101 may set a subset of the plurality of bits within the node-track MSR 120 to indicate which nodes are to be tracked using the counters.

The memory controller 118 may then allocate to respective counters the tracking of the subset of nodes represented by the plurality of bits of the node-track MSR 120. After the cache subsystem 108 tracks memory responses associated with memory requests of the subset of nodes (using the respective counters), the system software 101 may obtain counter values from the allocated counters. The system software may then use the counter values to calculate a per-node bandwidth for the subset of nodes. To continue monitoring additional nodes, the system software 101 may change the plurality of bits set within the node-track MSR 120 to correspond to a second subset of nodes that are different from the first subset of nodes. The memory controller 118 may then reallocate the plurality of counters to track memory responses associated with the second subset of nodes.

Figure 4:
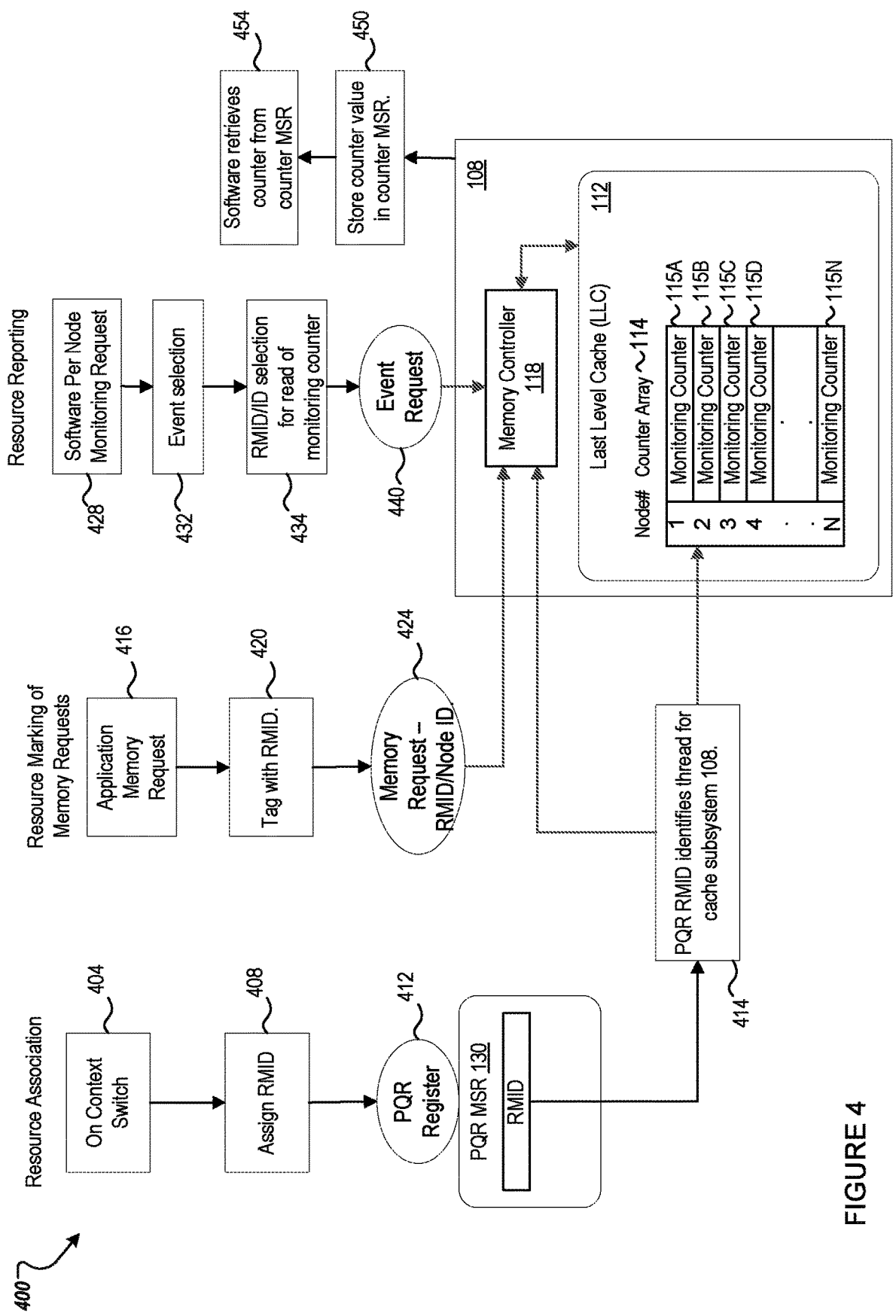
FIG. 4 is a flow diagram of a method of monitoring memory bandwidth on a per-node basis, according to an embodiment of the present disclosure.

With additional reference to FIG. 4, illustrating a flow diagram of a method 400 of monitoring memory bandwidth on a per-node basis according to an embodiment, one or more nodes may perform resource association after a context switch to a new application (404). Resource association is the association of an identifier (ID) with a resource such as a processing core, for example, in the context of a thread. A context switch is when a core switches from executing one thread to executing another thread. To perform resource association, the system software 101 may assign a resource monitoring identifier (RMID) to a core that is currently executing a thread of an application (408). The system software 101 may store the RMID in the PQR MSR 130 (412), so the memory controller 118 can access the RMID when issuing memory requests, as will be discussed, resulting in identification of the thread on behalf of the cache subsystem 108 (414). The PQR MSR 130 enforces that one RMID is active for any given core at a time. Upon a subsequent context switch, the software may update the PQR MSR 130, which changes the active RMID for the core to identify the currently executed thread.

In one embodiment, the memory controller 118 may also receive memory requests from a core that is executing an application, which includes a specific thread (416). The memory controller 118 may tag a memory request with the current RMID for the specific thread (from the PQR MSR 412) (420). The RMID value may be carried along with the address in the memory request as a number of extra bits. The memory controller 118 knows the nodes being tracked as having already allocated the counters of the monitoring counter array 114 (e.g., to track the nodes identified within the node-track MSR 120), resulting in a memory request containing both the RMID and the node ID (424).

In one embodiment, this tagging of memory requests results in data within the memory responses (such as cache misses) retaining the RMID with which the memory requests had been tagged and retaining the node ID (which is static information to the core). For example, the memory response may fetch the RMID from the request and the memory controller 118 may add the node ID on which the memory request is serviced. The memory controller 118 may then, upon receipt of a memory response, determine the RMID and the node ID within the data of the memory response, and increment the counter in the monitoring counter array 114 allocated to track that specific RMID and node ID. In some cases, the cache subsystem 108 may detect only the RMID (and not a node ID) in the memory response data as the cache miss may be for a memory request sent to an untracked node. In this case, the counters for total bandwidth may still be incremented as well as the counter for local bandwidth, if applicable, e.g., when the memory response was for a request issued to the node 102 (the local node).

In one embodiment, as discussed, the system software 101 may request to monitor memory responses (such as cache misses) from nodes to which memory requests for a thread may be directed (428). Accordingly, the system software may do so by setting a plurality of bits within the node-track MSR 120 to indicate which nodes are to be tracked with the counters of the monitoring counter array. In one embodiment, this may be performed by setting bits of a bit-map that may map onto and enable bits of the node-track MSR 120.

Figure 3:
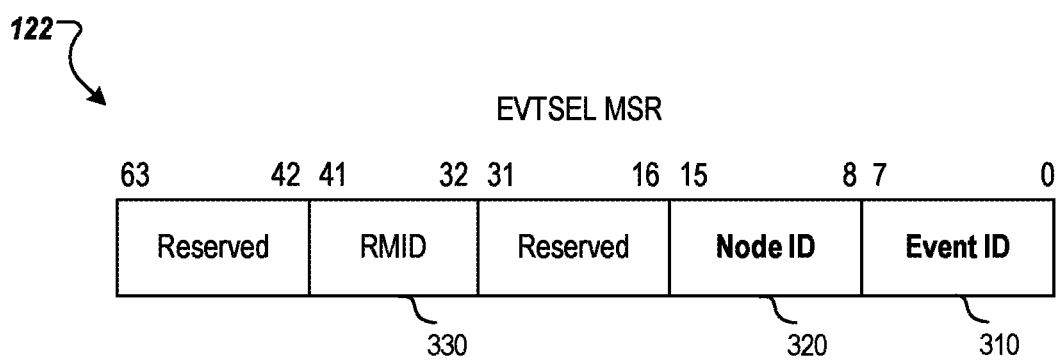
FIG. 3 is a block diagram representation of an event selection MSR, according to an embodiment of the present disclosure.

After a period of time passes so that the counter values of the counters in the monitoring counter array 114 have time to be incremented, the system software 101 may employ the event selection MSR 122 to identify to the cache subsystem 108 the counter values to be read. To do so, the system software 101 may set a number of bits within the event selection MSR 122, which is shown in detail in FIG. 3. For example, the system software 101 may set the bits of an event ID field 310 to indicate node bandwidth as the type of monitoring data requested (432). The system software 101 may also set the bits of an RMID field 330 so that the memory controller knows which array of counters to access, and may also set the bits of a node ID field 320 corresponding to the node that has been tracked and for which a per-node counter value is to be read (434). In the case where only a per-RMID is requested, the system software clears the bits of the node ID field.

Once the system software 110 sets bits for these fields, the system software may send an event request to the cache subsystem 108 so that the memory controller 118 knows which counter to read (440). The memory controller 118 may alternatively, or additionally, request the event selection MSR 122 to identify the RMID and the node ID associated with the counter to be read. The memory controller 118 may then read the counter value corresponding to the RMID and node ID within the monitoring counter array and store the counter value in the counter MSR 126 (450). The system software 101 may retrieve the counter value from the counter MSR 126 (454), calculate a bandwidth value based on the counter value, and store the bandwidth value for the node associated with that counter value for comparison with total bandwidth or with the bandwidth of other nodes of the subset nodes, as will be explained in more detail. The steps of 432, 434, 440, and 450 may be performed serially and iteratively to retrieve the counter values for each node of the subset of nodes for which monitoring was requested by setting the bits in the node-track MSR 120.

Figure 5:
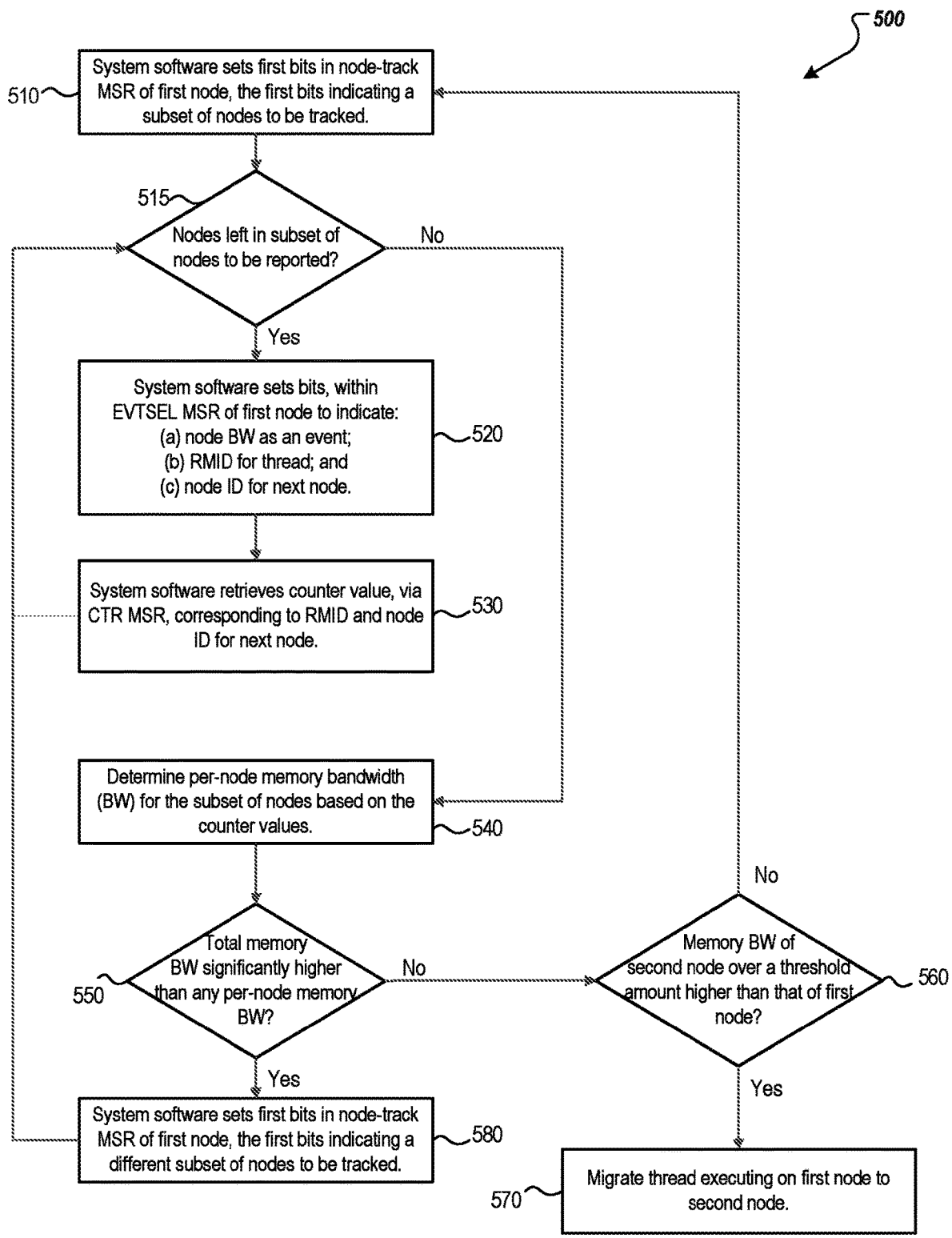
FIG. 5 is a flow diagram of a method of monitoring memory bandwidth on a per-node basis, according to an embodiment of the present disclosure.
Figure 7:
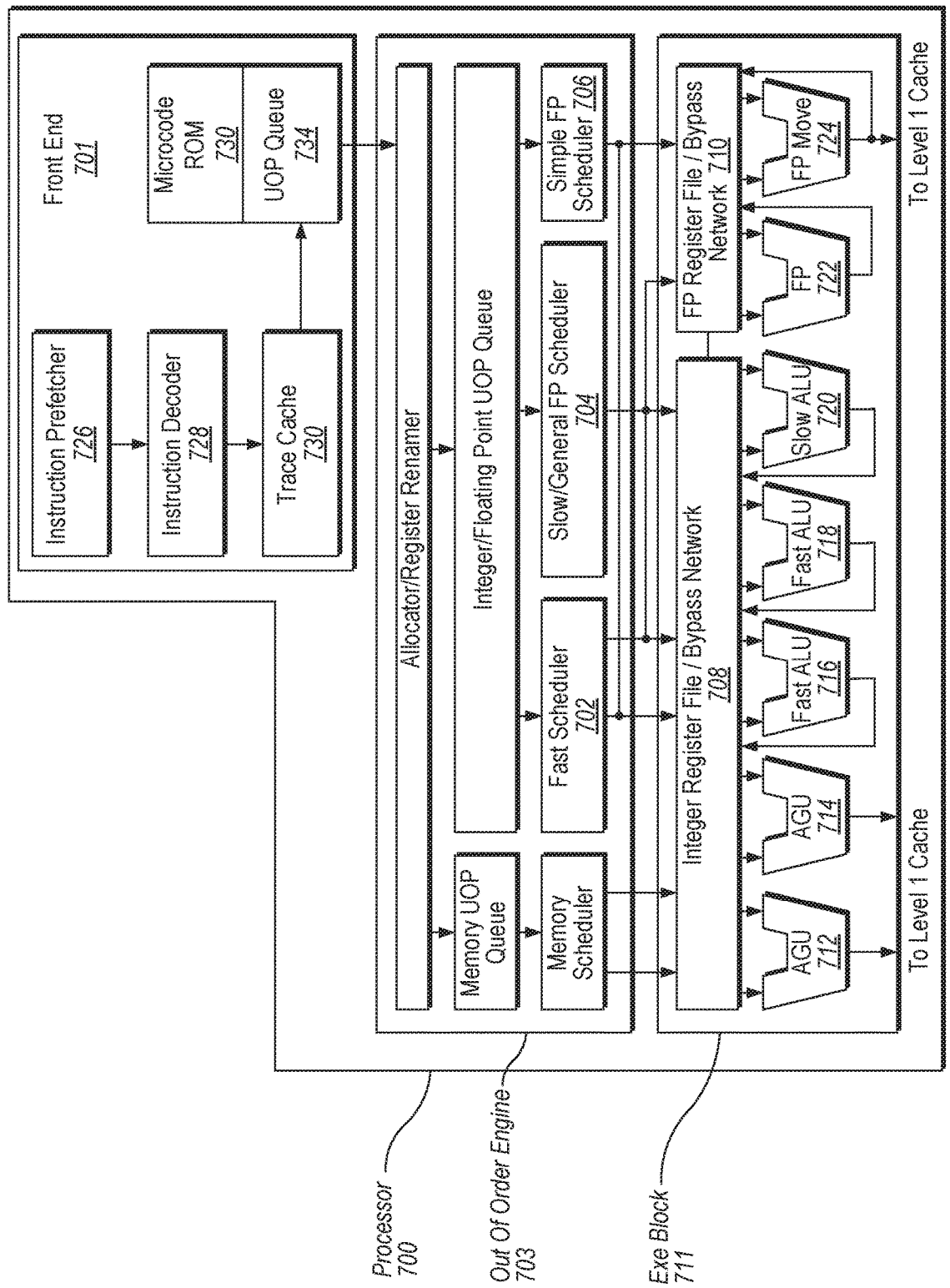
FIG. 7 illustrates a block diagram of the micro-architecture for a processor that includes logic circuits to provide measurement capability of memory bandwidth on a per-node basis.

FIG. 5 is a flow diagram of a method 500 of monitoring memory bandwidth on a per-node basis, according to an embodiment of the present disclosure. The method 500 may be performed by a system that may include hardware (e.g., circuitry, dedicated logic, and/or programmable logic), software (e.g., instructions executable on a computer system to perform hardware simulation), or a combination thereof. In an illustrative example, the method 800 may be performed by any or a combination of the nodes 102A . . . 102H of FIG. 1A or node 102 of FIG. 1B. In particular, one or more of these nodes may execute the system software 101 to perform the method 500.

Referring to FIG. 5, the method 800 may start where the system software 101 sets first bits in the node-track MSR 120 of a first node (e.g., node 102), the first bits indicating a subset of nodes to be tracked in terms of bandwidth monitoring by the cache subsystem 108 (510). The subset of nodes may include the first node. The method 500 may continue with, after a waiting period during which counter values accrue within the monitoring counter array 114, the system software determining whether there are any nodes of the subset of nodes left to be reported (e.g., for which to obtain a counter value from the cache subsystem 108) (515).

Assuming there is still a counter value for a node of the subset of nodes to be obtained from the cache subsystem, the method 500 continues with the system software setting bits within the event selection MSR 122 to indicate: (a) node bandwidth as the event; (b) the RMID for a thread; and (b) a node ID corresponding to the next node of the subset of nodes for which the cache subsystem 108 should retrieve a counter value (520). The method 800 may continue with the system software retrieving the counter value, from the counter MSR 126, corresponding to the RMID and node ID for that next node (530). The system software may iteratively perform steps 520 and 530 for the subset of nodes until the answer to the inquiry of block 515 is "no."

The method 500 may continue with the system software determining a per-node memory bandwidth of the subset of nodes based on the counter values (540). For example, the system software may multiply a counter value by a scaler to calculate a bandwidth value for the node. The system software may also obtain the total memory bandwidth for the nodes 102A . . . 102H as discussed previously, by not specifying the node ID while still supplying the RMID within the event selection MSR 122. The method 500 may continue with the system software determining whether the total memory bandwidth (for the nodes 102A . . . 102H, for example) is higher than the bandwidth for any node of the subset of nodes (550). The total bandwidth may be significantly higher where, for example, the total bandwidth is over a threshold amount higher (such as 2×, 3×, 3.5×, 4×, or the like) than any per-node bandwidth. If the answer is yes to the inquiry of block 550, then there may not be a data locality problem worth resolving with respect to the thread, and the method 500 may continue with the system software setting the first bits of the node-track MSR 120 indicating a different subset of nodes to be tracked (580). The method 500 may then loop back to block 515 after a period of time to obtain counter values for the different subset of nodes.

If the answer to the inquiry of block 550 is no, the method 500 may continue with determining whether the memory bandwidth of a second node of the subset of nodes (e.g., the last subset of nodes to be tracked) is over a second threshold amount higher than that of the first node (560). This threshold amount higher may be, for example, two times, three times, or four times (or some other ratio) higher than the first node's memory bandwidth. If the answer to the inquiry of block 560 is yes, the system software may migrate the thread executing on the first node to the second node, to thus improve data locality for the thread. If the answer to the inquiry of block 560 is no, the method may start over again.

FIG. 6A is a block diagram illustrating a micro-architecture for a processor 600 that is used to detect and avoid bus lock conditions. Specifically, processor 600 depicts an in-order architecture core and a register renaming logic, out-of-order issue/execution logic to be included in a processor according to at least one embodiment of the disclosure. The embodiments of detecting and avoiding bus lock conditions can be implemented in processor 600.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor. Note that instruction cache unit 634, data cache unit 674, and L2 cache unit 676 would not generally implement the process described in this disclosure, as generally these cache units use on-die memory that does not exhibit page-locality behavior.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 8:
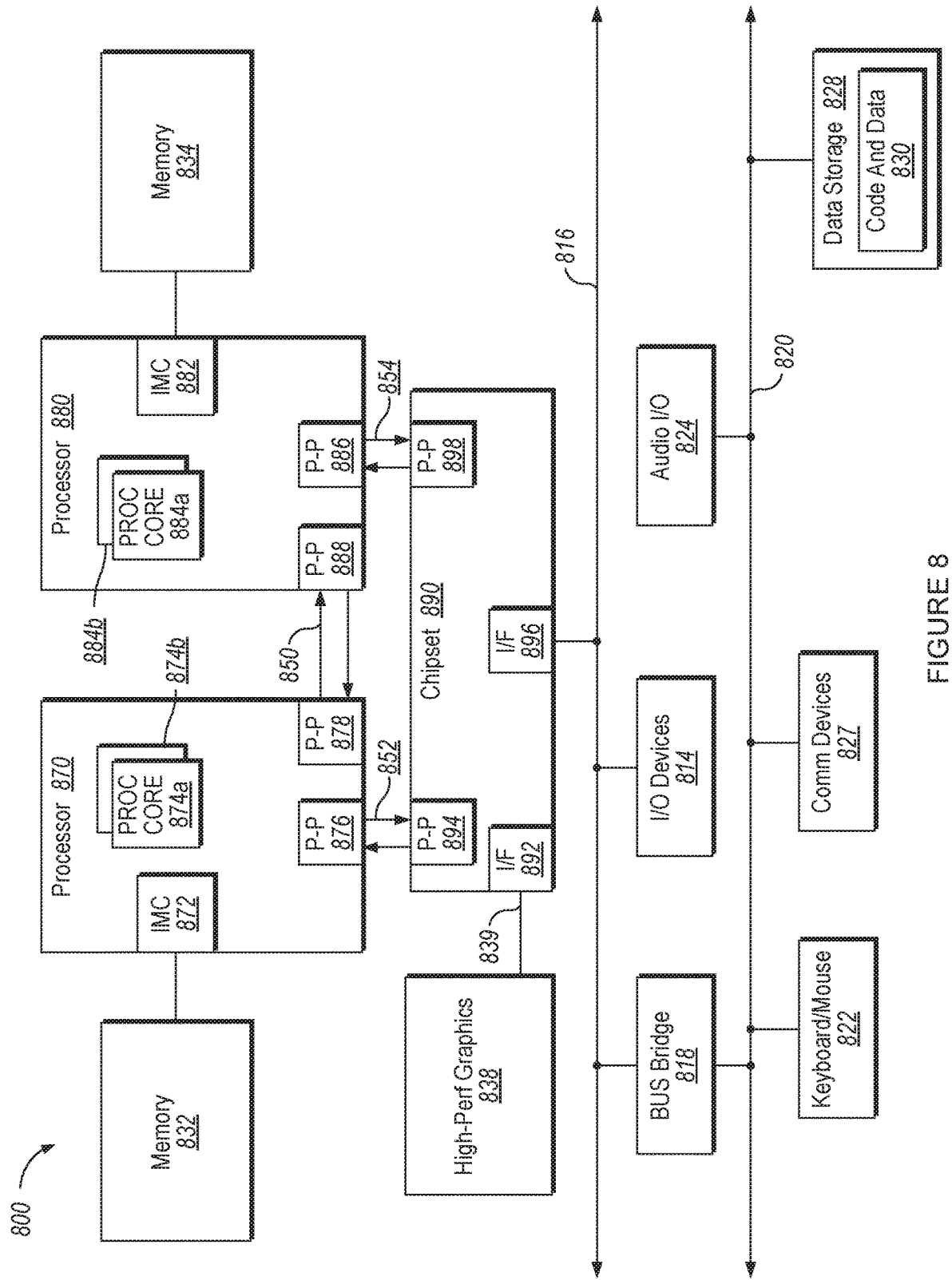
FIG. 8 is a block diagram of a computer system according to one implementation.

FIG. 8 illustrates a block diagram of the micro-architecture for a processor 800 that includes logic circuits that may be used to detect and avoid bus lock conditions according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 801 is the part of the processor 800 that fetches instructions to be executed and prepares them to be used later in the processor pipeline. The embodiments of the page additions and content copying can be implemented in processor 800.

The front end 801 may include several units. In one embodiment, the instruction prefetcher 816 fetches instructions from memory and feeds them to an instruction decoder 818 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 830 takes decoded uops and assembles them into program ordered sequences or traces in the uop queue 834 for execution. When the trace cache 830 encounters a complex instruction, microcode ROM (or RAM) 832 provides the uops needed to complete the operation.

Some instructions are converted into a single micro-op, whereas others need several micro-ops to complete the full operation. In one embodiment, if more than four micro-ops are needed to complete an instruction, the decoder 818 accesses the microcode ROM 832 to do the instruction. For one embodiment, an instruction can be decoded into a small number of micro ops for processing at the instruction decoder 818. In another embodiment, an instruction can be stored within the microcode ROM 832 should a number of micro-ops be needed to accomplish the operation. The trace cache 830 refers to an entry point programmable logic array (PLA) to determine a correct micro-instruction pointer for reading the micro-code sequences to complete one or more instructions in accordance with one embodiment from the micro-code ROM 832. After the microcode ROM 832 finishes sequencing micro-ops for an instruction, the front end 801 of the machine resumes fetching micro-ops from the trace cache 830.

The out-of-order execution engine 803 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 802, slow/general floating point scheduler 804, and simple floating point scheduler 806. The uop schedulers 802, 804, 806, determine when a uop is ready to execute based on the readiness of their dependent input register operand sources and the availability of the execution resources the uops need to complete their operation. The fast scheduler 802 of one embodiment can schedule on each half of the main clock cycle while the other schedulers can only schedule once per main processor clock cycle. The schedulers arbitrate for the dispatch ports to schedule uops for execution.

Register files 808, 810, sit between the schedulers 802, 804, 806, and the execution units 812, 814, 816, 818, 820, 822, 824 in the execution block 811. There is a separate register file 808, 810, for integer and floating point operations, respectively. Each register file 808, 810, of one embodiment also includes a bypass network that can bypass or forward just completed results that have not yet been written into the register file to new dependent uops. The integer register file 808 and the floating point register file 810 are also capable of communicating data with the other. For one embodiment, the integer register file 808 is split into two separate register files, one register file for the low order 32 bits of data and a second register file for the high order 32 bits of data. The floating point register file 810 of one embodiment has 128 bit wide entries because floating point instructions typically have operands from 64 to 128 bits in width.

The execution block 811 contains the execution units 812, 814, 816, 818, 820, 822, 824, where the instructions are actually executed. This section includes the register files 808, 810, that store the integer and floating point data operand values that the micro-instructions need to execute. The processor 800 of one embodiment is comprised of a number of execution units: address generation unit (AGU) 812, AGU 814, fast ALU 816, fast ALU 818, slow ALU 810, floating point ALU 812, floating point move unit 814. For one embodiment, the floating point execution blocks 812, 814, execute floating point, MMX, SIMD, and SSE, or other operations. The floating point ALU 812 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 816, 818. The fast ALUs 817, 818, of one embodiment can execute fast operations with an effective latency of half a clock cycle. For one embodiment, most complex integer operations go to the slow ALU 820 as the slow ALU 820 includes integer execution hardware for long latency type of operations, such as a multiplier, shifts, flag logic, and branch processing. Memory load/store operations are executed by the AGUs 822, 824. For one embodiment, the integer ALUs 816, 818, 820, are described in the context of performing integer operations on 64 bit data operands. In alternative embodiments, the ALUs 816, 818, 820, can be implemented to support a variety of data bits including 16, 32, 128, 256, etc. Similarly, the floating point units 822, 824, can be implemented to support a range of operands having bits of various widths. For one embodiment, the floating point units 822, 824, can operate on 128 bits wide packed data operands in conjunction with SIMD and multimedia instructions.

In one embodiment, the uops schedulers 802, 804, 806, dispatch dependent operations before the parent load has finished executing. As uops are speculatively scheduled and executed in processor 800, the processor 800 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 880 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors.

While shown with two processors 870, 880, it is to be understood that the scope of the present disclosure is not so limited. In other implementations, one or more additional processors may be present in a given processor.

Processors 870 and 880 are shown including integrated memory controller units 872 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode. Page locality may also be created in the shared cache across one or more cache controllers when allocating entries to the shared cache.

Chipset 890 may be coupled to a first bus 816 via an interface 896. In one embodiment, first bus 816 may be a Peripheral Component Interconnect (PCI) bus, or a bus such as a PCI Express bus or interconnect bus, although the scope of the present disclosure is not so limited.

Figure 9:
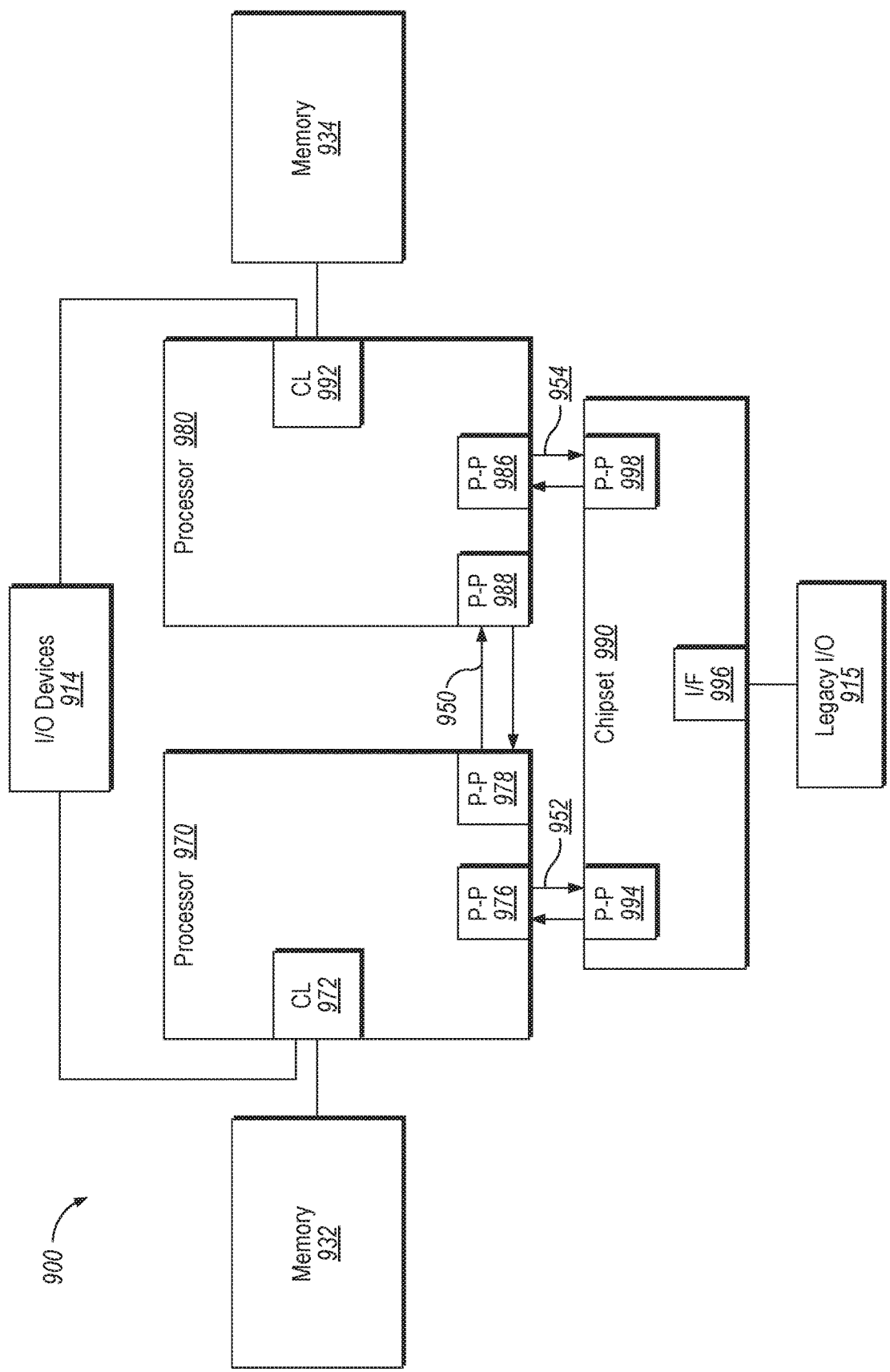
FIG. 9 is a block diagram of a computer system according to another implementation.

Referring now to FIG. 9, shown is a block diagram of a third system 900 in accordance with an embodiment of the present disclosure. Like elements in FIGS. 8 and 9 bear like reference numerals, and certain aspects of FIG. 9 have been omitted from FIG. 8 in order to avoid obscuring other aspects of FIG. 9.

FIG. 9 illustrates that the processors 970, 980 may include integrated memory and I/O control logic ("CL") 972 and 992, respectively. For at least one embodiment, the CL 972, 982 may include integrated memory controller units such as described herein. In addition. CL 972, 992 may also include I/O control logic. FIG. 9 illustrates that the memories 932, 934 are coupled to the CL 972, 992, and that I/O devices 914 are also coupled to the control logic 972, 992. Legacy I/O devices 915 are coupled to the chipset 990.

Figure 10:
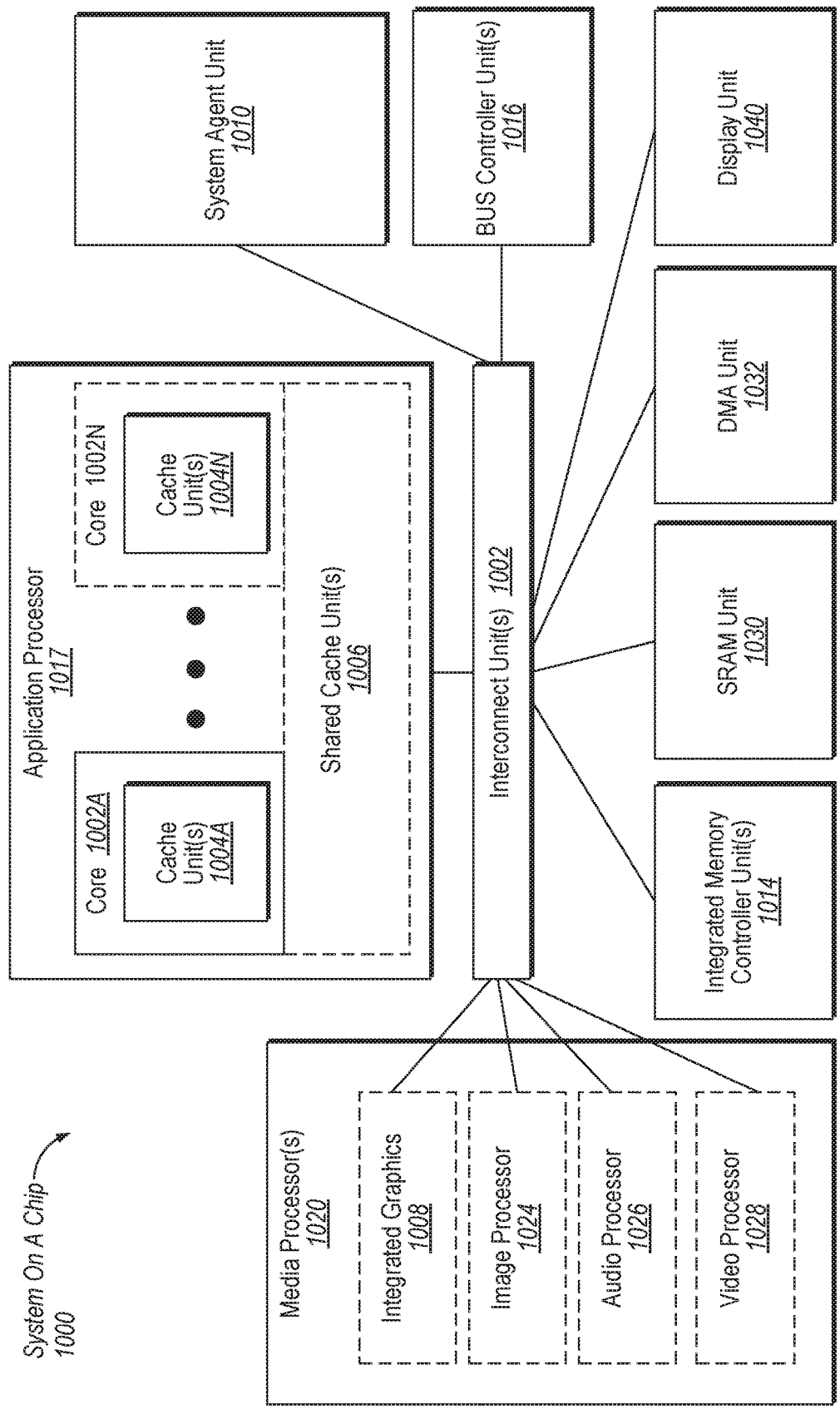
FIG. 10 is a block diagram of a system-on-a-chip according to one implementation.

FIG. 10 is an exemplary system on a chip (SoC) 1000 that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1000 of FIG. 10, dashed lined boxes are features on more advanced SoCs. An interconnect unit(s) 1002 may be coupled to: an application processor 1017 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays.

Figure 11:
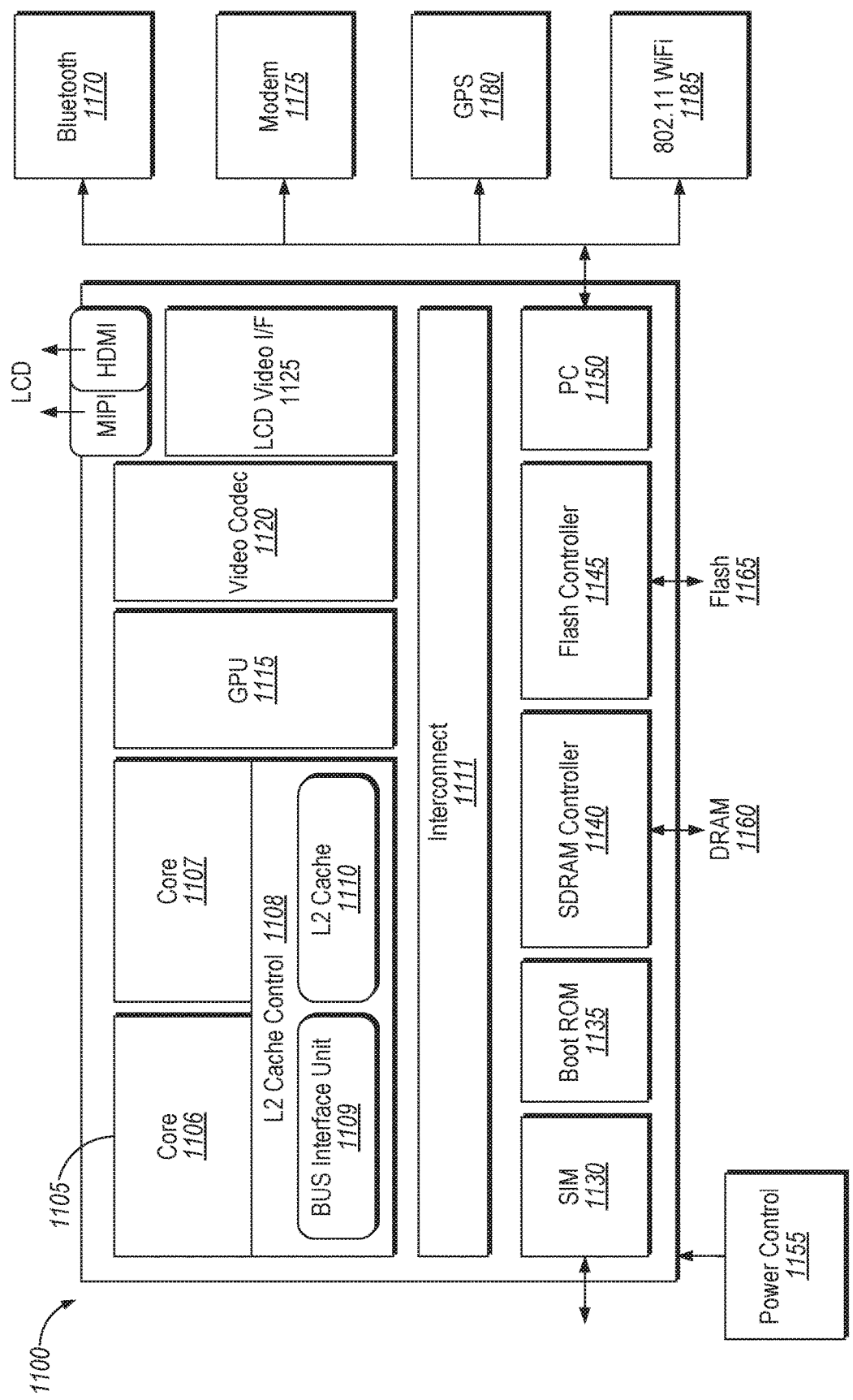
FIG. 11 illustrates another implementation of a block diagram for a computing system.

Turning next to FIG. 11, an embodiment of a system on-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1100.

Here, SoC 1100 includes 2 cores-1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

In one embodiment, SDRAM controller 1140 may connect to interconnect 1111 via cache 125. Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth® module 1170, 3G modem 1175, GPS 1180, and Wi-Fi® 1185. Note as stated above, a UE includes a radio for communication. As a result, these peripheral communication modules may not all be included. However, in a UE some form of a radio for external communication should be included.

Figure 12:
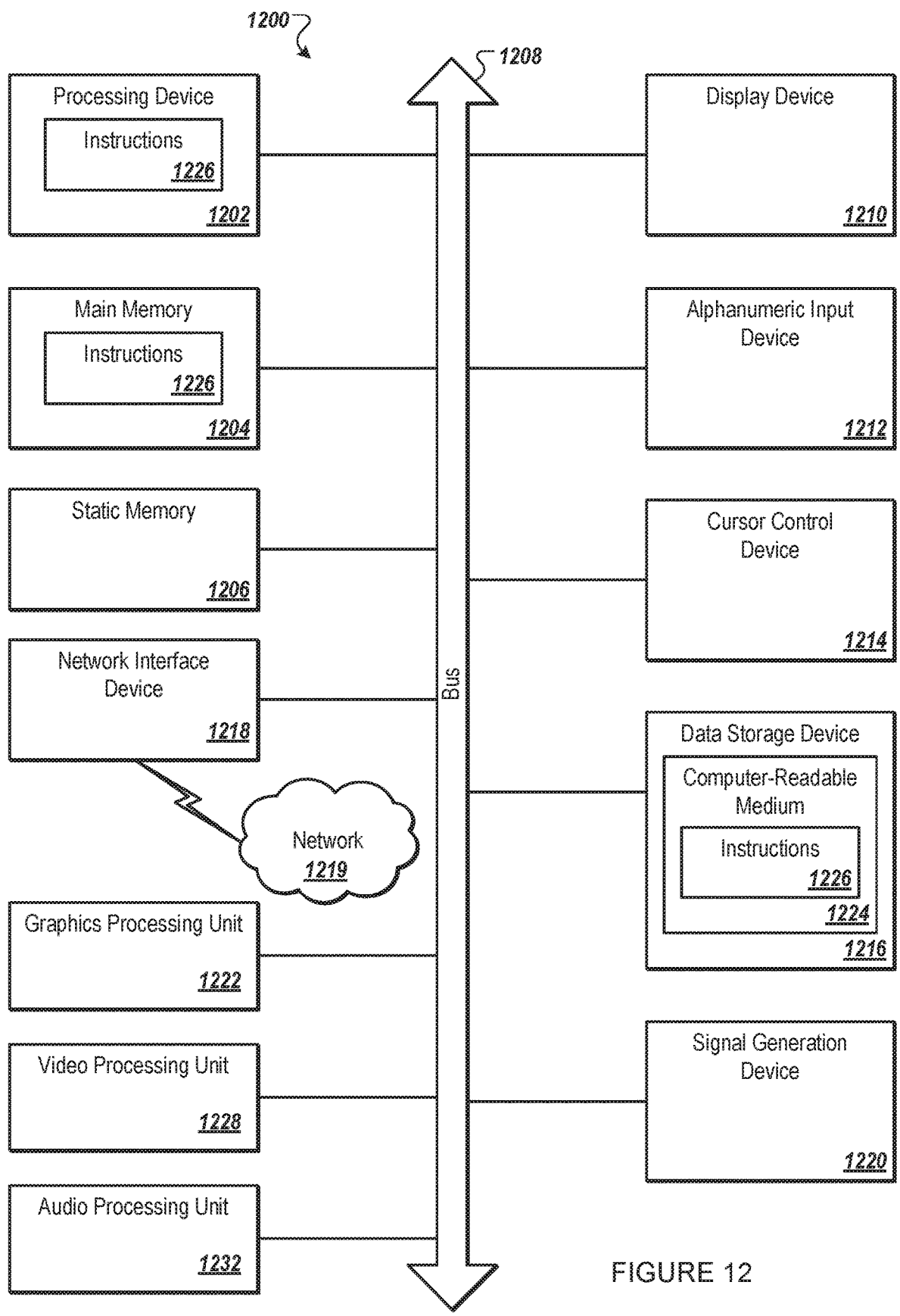
FIG. 12 illustrates another implementation of a block diagram for a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1200.

The computing system 1200 includes a processing device 1202, main memory 1204 (e.g., flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1208. In one embodiment, the bus 1208 may be made up of the system bus 170-1 and/or the memory bus 170-2 of FIG. 1, and the memory and peripheral devices sharing the bus 1208 may be or work through the system agent 124 similar to as discussed with reference to FIG. 1.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processor cores.

The processing device 1202 is configured to execute the processing logic 1226 for performing the operations discussed herein.

In one embodiment, processing device 1202 can be part of the computing system 100 of FIG. 1. Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1218 communicably coupled to a network 1219. The computing system 1200 also may include a video display device 1210 (e.g., a liquid crystal display (LCD) or a cathode ray tube (CRT)), an alphanumeric input device 1210 (e.g., a keyboard), a cursor control device 1214 (e.g., a mouse), a signal generation device 1220 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIGS. 1 and 2, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a computing system comprising: 1) plurality of nodes including a first node, the first node comprising at least one processing core, a memory controller, a node-track register (MSR), and a monitoring counter array including a plurality of counters; and 2) wherein the memory controller is to: a) access a plurality of bits of the node-track MSR to determine a subset of nodes to be tracked, wherein the subset of nodes includes the first node and a second node; b) allocate a first counter of the plurality of counters to track memory requests sent to a local system memory by the first node; and c) allocate a second counter of the plurality of counters to track memory responses associated with memory requests sent by the first node to the second node.

In Example 2, the computing system of Example 1, wherein tracking the memory responses comprises tracking cache misses at a last-level cache (LLC) of the first node, received in response to memory requests sent, by the first node, to the first node and the second node.

In Example 3, the computing system of Example 1, wherein the memory controller is further to, upon receiving a memory response tagged with a resource monitoring identifier (RMID) identifying a thread: a) determine a node identifier (ID) associated with the memory response; and b) update one of the first counter or the second counter that corresponds to the RMID and the node ID of the memory response.

In Example 4, the computing system of Example 3, wherein the memory controller is further to: a) detect a context switch to a second thread; and b) tag a second memory request with a second RMID corresponding to the second thread.

In Example 5, the computing system of Example 3, wherein the memory controller is to receive memory responses from one of the local system memory and point-to-point processor interconnects of the subset of nodes.

In Example 6, the computing system of Example 3, wherein the first node further comprises 1) an event selection register including an event identifier portion, an RMID portion, and a node identifier portion, and wherein the first node is further to, for a third node of the subset of nodes: a) set the event identifier portion to indicate tracking of node bandwidth; b) set the RMID portion to specify the RMID; and c) set the node identifier portion to specify a node ID corresponding the third node; and wherein the memory controller is further to, for the third node of the subset of nodes: d) read the event selection register to identify the RMID and the node ID for the third node; and e) store, in a counter MSR of the first node, a counter value from the monitoring counter array, the counter value corresponding to the node ID and the RMID; and wherein the first node is further to iteratively, for each node of the subset of nodes: f) retrieve the counter value for the node from the counter MSR; and g) calculate a memory bandwidth for the node from the counter value.

In Example 7, the computing system of Example 6, wherein responsive to determining that the memory bandwidth of the second node of the subset of nodes is over a threshold amount higher than a memory bandwidth of the first node, the first node is further to migrate the thread executing on the first node to the second node.

In Example 8, the computing system of Example 1, wherein the subset of nodes includes the plurality of nodes.

Various embodiments may have different combinations of the structural features described above. For instance, all optional features of the computing system described above may also be implemented with respect to the method or process described herein and specifics in the examples may be used anywhere in one or more embodiments.

Example 9 is a node comprising: 1) at least one processing core, 2) a memory controller, 3) a node-track register (MSR), and 4) a monitoring counter array including a plurality of counters; and wherein the memory controller is to: a) access a plurality of bits of the node-track MSR to determine a subset of nodes of a plurality of nodes to be tracked, wherein the subset of nodes includes the node and a second node of the plurality of nodes; b) allocate a first counter of the plurality of counters to track memory requests sent to a local system memory by the node; and c) allocate a second counter of the plurality of counters to track a memory responses associated with memory requests sent by the node to the second node.

In Example 10, the node of Example 9, wherein tracking the memory responses comprises tracking cache misses at a last-level cache (LLC) of the node, received in response to memory requests sent to the node and the second node.

In Example 11, the node of Example 9, wherein the memory controller is further to, upon receiving a memory response tagged with a resource monitoring identifier (RMID) identifying a thread: a) determine a node identifier (ID) associated with the memory response; and b) update one of the first counter or the second counter that corresponds to the RMID and the node ID of the memory response.

In Example 12, the node of Example 11, wherein the memory controller is further to: a) detect a context switch to a second thread; and b) tag a second memory request with a second RMID corresponding to the second thread.

In Example 13, the node of Example 11, wherein the memory controller is to receive memory responses from one of local system memory and point-to-point processor interconnects of the subset of nodes.

In Example 14, the node of Example 11, wherein the node further comprises an 1) event selection register including an event identifier portion, an RMID portion, and 2) a node identifier portion, and wherein the node is further to, for a third node of the subset of nodes: a) set the event identifier portion to indicate tracking of node bandwidth; set the RMID portion to specify the RMID; and b) set the node identifier portion to specify a node ID corresponding the third node; and wherein the memory controller is further to, for the third node of the subset of nodes: c) read the event selection register to identify the RMID and the node ID for the third node; and d) store, in a counter MSR of the node, a counter value from the monitoring counter array, the counter value corresponding to the node ID and the RMID; and wherein the node is further to iteratively, for each node of the subset of nodes: e) retrieve the counter value for the node from the counter MSR; and f) calculate a memory bandwidth for the node from the counter value.

In Example 15, the node of Example 14, wherein responsive to determining that the memory bandwidth of the second node of the subset of nodes is over a threshold amount higher than a memory bandwidth of the node, the node is further to migrate the thread executing on the node to the second node.

Various embodiments may have different combinations of the structural features described above. For instance, all optional features of the processors and methods described above may also be implemented with respect to a system described herein and specifics in the examples may be used anywhere in one or more embodiments.

Example 16 is a method comprising: 1) retrieving, by at least a first node of a plurality of nodes, counter values for a thread being executed by the first node, wherein the retrieving is from a counter register (MSR) of the first node, and wherein respective counter values are associated with a resource monitoring identifier (RMID) corresponding to the thread and with a node identifier (ID) corresponding to one of a subset of nodes of the plurality of nodes, wherein the subset of nodes includes the first node; 2) determining, based on the counter values, a per-node memory bandwidth for the subset of nodes; and 3) responsive to determining a memory bandwidth of a second node of the subset of nodes is over a threshold amount higher than a memory bandwidth of the first node, migrating a thread executing on the first node to the second node.

In Example 17, the method of Example 16, further comprising setting a plurality of bits within a node-track MSR of the first node, wherein the plurality of bits indicate the subset of nodes of the plurality of nodes to be tracked for memory utilization.

In Example 18, the method of Example 17, further comprising: 1) requesting, by a memory controller of the first node, the plurality of bits from the node-track MSR; 2) allocating, by the memory controller, to a first counter of a plurality of counters, to track memory requests sent to local memory by the first node; and 3) allocating, to a second counter of the plurality of counters, to track memory responses associated with memory requests sent by the first node to a second node of the subset of nodes, wherein the plurality of bits identifies at least the first node and the second node; upon receipt of a memory response tagged with the RMID associated with the thread, the memory controller: 4) determining a node ID associated with the memory response; and 5) updating one of the first counter or the second counter that corresponds to the RMID and the node ID of the memory response.

In Example 19, the method of Example 18, wherein to track the memory responses comprises tracking cache misses at a last level cache (LLC) of the first node, received in response to memory requests sent to the first node and the second node.

In Example 20, the method of Example 18, further comprising: 1) accessing, by the first node, an event selection register including an event identifier portion, an RMID portion, and a node identifier portion and, for a third node of the subset of nodes: 2) setting the event identifier portion to indicate tracking of node bandwidth; 3) setting the RMID portion of bits to specify the RMID; and 4) setting the node identifier portion to specify a node ID corresponding to the third node of the subset of nodes; and 5) accessing, by the memory controller, the event selection register to identify the RMID and the node ID; and 6) storing, by the memory controller, in the counter MSR of the first node, a counter value from the plurality of counters corresponding to the node ID and the RMID In Example 21, the method of Example 20, further comprising, responsive to determining that a total memory bandwidth of the plurality of nodes is over a second threshold amount higher than any per-node memory bandwidth of the nodes of the subset of nodes: 1) setting the plurality of bits within the node-track MSR of the first node to track a second subset of nodes different than the subset of nodes, wherein the second subset of nodes also includes the first node; 2) determining a per-node memory bandwidth for the second subset of nodes; and 3) responsive to determining a memory bandwidth of a third node of the second subset of nodes is over the threshold amount higher than the memory bandwidth of the first node, migrating the thread executing on the first node to the third node.

Various embodiments may have different combinations of the structural features described above. For instance, all optional features of the processors and methods described above may also be implemented with respect to a system described herein and specifics in the examples may be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to determining validity of data in cache lines of a sector-based cache in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the above examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A computing system comprising:
a plurality of nodes including a first node, the first node comprising at least one processing core, a memory controller, a node-track register, and a monitoring counter array including a plurality of counters; and
wherein the memory controller is to:
access a plurality of bits of the node-track register to determine a subset of nodes to be tracked, wherein the subset of nodes includes the first node and a second node;
allocate a first counter of the plurality of counters to track memory requests sent to a local system memory by the first node; and
allocate a second counter of the plurality of counters to track memory responses associated with memory requests sent by the first node to the second node.

2. The computing system of claim 1, wherein tracking the memory responses comprises tracking cache misses at a last-level cache (LLC) of the first node, received in response to memory requests sent, by the first node, to the first node and the second node.

3. The computing system of claim 1, wherein the memory controller is further to, upon receiving a memory response tagged with a resource monitoring identifier (RMID) identifying a thread:
determine a node identifier (ID) associated with the memory response; and
update one of the first counter or the second counter that corresponds to the RMID and the node ID of the memory response.

4. The computing system of claim 3, wherein the memory controller is further to:
detect a context switch to a second thread; and
tag a second memory request with a second RMID corresponding to the second thread.

5. The computing system of claim 3, wherein the memory controller is to receive memory responses from one of the local system memory and point-to-point processor interconnects of the subset of nodes.

6. The computing system of claim 3, wherein the first node further comprises an event selection register including an event identifier portion, an RMID portion, and a node identifier portion, and wherein the first node is further to, for a third node of the subset of nodes:
set the event identifier portion to indicate tracking of node bandwidth;
set the RMID portion to specify the RMID; and
set the node identifier portion to specify a node ID corresponding the third node; and
wherein the memory controller is further to, for the third node of the subset of nodes:
read the event selection register to identify the RMID and the node ID for the third node; and
store, in a counter model-specific register (MSR) of the first node, a counter value from the monitoring counter array, the counter value corresponding to the node ID and the RMID; and
wherein the first node is further to iteratively, for each node of the subset of nodes:
retrieve the counter value for the node from the counter MSR; and
calculate a memory bandwidth for the node from the counter value.

7. The computing system of claim 6, wherein responsive to determining that the memory bandwidth of the second node of the subset of nodes is over a threshold amount higher than a memory bandwidth of the first node, the first node is further to migrate the thread executing on the first node to the second node.

8. The computing system of claim 1, wherein the subset of nodes includes the plurality of nodes.

9. A node comprising:
at least one processing core, a memory controller, a node-track register, and a monitoring counter array including a plurality of counters; and
wherein the memory controller is to:
access a plurality of bits of the node-track register to determine a subset of nodes of a plurality of nodes to be tracked, wherein the subset of nodes includes the node and a second node of the plurality of nodes;
allocate a first counter of the plurality of counters to track memory requests sent to a local system memory by the node; and
allocate a second counter of the plurality of counters to track a memory responses associated with memory requests sent by the node to the second node.

10. The node of claim 9, wherein tracking the memory responses comprises tracking cache misses at a last-level cache (LLC) of the node, received in response to memory requests sent to the node and the second node.

11. The node of claim 9, wherein the memory controller is further to, upon receiving a memory response tagged with a resource monitoring identifier (RMID) identifying a thread:
determine a node identifier (ID) associated with the memory response; and
update one of the first counter or the second counter that corresponds to the RMID and the node ID of the memory response.

12. The node of claim 11, wherein the memory controller is further to:
   detect a context switch to a second thread; and
   tag a second memory request with a second RMID corresponding to the second thread.

13. The node of claim 11, wherein the memory controller is to receive memory responses from one of local system memory and point-to-point processor interconnects of the subset of nodes.

14. The node of claim 11, wherein the node further comprises an event selection register including an event identifier portion, an RMID portion, and a node identifier portion, and wherein the node is further to, for a third node of the subset of nodes:
   set the event identifier portion to indicate tracking of node bandwidth;
   set the RMID portion to specify the RMID; and
   set the node identifier portion to specify a node ID corresponding the third node; and wherein the memory controller is further to, for the third node of the subset of nodes:
   read the event selection register to identify the RMID and the node ID for the third node; and
   store, in a counter MSR of the node, a counter value from the monitoring counter array, the counter value corresponding to the node ID and the RMID; and wherein the node is further to iteratively, for each node of the subset of nodes:
   retrieve the counter value for the node from the counter MSR; and
   calculate a memory bandwidth for the node from the counter value.

15. The node of claim 14, wherein responsive to determining that the memory bandwidth of the second node of the subset of nodes is over a threshold amount higher than a memory bandwidth of the node, the node is further to migrate the thread executing on the node to the second node.

* * * * *